United States Patent [19]

Hofmann

[11] 4,283,645
[45] Aug. 11, 1981

[54] ELECTRICAL DRIVE MOTOR, IN PARTICULAR FOR WATER PUMPS IN THE FIELD OF AQUARIA

[76] Inventor: Kurt H. Hofmann, Elmur Eulenthal, 5063 Overath, Fed. Rep. of Germany

[21] Appl. No.: 74,712

[22] Filed: Sep. 11, 1979

[30] Foreign Application Priority Data

Oct. 6, 1978 [DE] Fed. Rep. of Germany ... 7829842[U]

[51] Int. Cl.³ .............................................. H02K 5/12
[52] U.S. Cl. ........................................ 310/87; 310/66; 310/71; 310/108; 417/420
[58] Field of Search ...................... 310/87, 88, 89, 90, 310/66, 62, 63, 58, 157, 71, 103-109, 42, 43; 417/420, 423, 424; 339/90 R

[56] References Cited

U.S. PATENT DOCUMENTS

| | | | |
|---|---|---|---|
| 2,790,916 | 4/1957 | Hinman | 310/87 |
| 3,203,353 | 8/1965 | Ruby | 310/91 |
| 3,411,450 | 11/1968 | Clifton | 417/420 |
| 3,746,472 | 7/1973 | Rupp | 310/87 |
| 3,749,949 | 7/1973 | Muller | 310/62 |
| 3,767,330 | 10/1973 | Signorille | 417/420 |
| 4,086,034 | 4/1978 | Hokky | 417/424 |
| 4,111,614 | 9/1978 | Martin | 417/420 |

*Primary Examiner*—R. Skudy
*Attorney, Agent, or Firm*—Browdy & Neimark

[57] ABSTRACT

There is disclosed an electrical drive motor, in particular for the water pumps in the field of aquaria, wherein the housing is universally sealed liquid- and gas-proof and wherein a permanent-magnetic coupling is located on the motor shaft acting through the sealed housing wall. In order to render this drive motor independent so that it may be used for various units, is able to be connected thereto with no problems and in addition thereto is reliable, the side of the motor housing directed toward the water pump is defined as a thin-walled diaphragm with a planar outer surface which is engagable with a likewise planar sealed diaphragm surface of the pump casing, in the area of the diaphragm securing means being provided for connecting the motor housing to the pump casing. Such a motor may be used with no problems in the field of aquaria and may even be used submerged in water.

13 Claims, 3 Drawing Figures

ELECTRICAL DRIVE MOTOR, IN PARTICULAR FOR WATER PUMPS IN THE FIELD OF AQUARIA

BACKGROUND OF THE INVENTION

This invention relates to an electrical drive motor, in particular for water pumps in the field of aquaria, including a universally sealed liquid- and gas-proof housing as well as a permanent-magnetic coupling acting through the sealed housing wall.

In a conventional electrical drive motor of the type referred to, the motor housing is firmly connected to the casing of a centrifugal pump, the pump region through which water flows being separated from the motor region by a sealed separating wall. Such a drive motor is only able to be used with a complementary pump casing for which it has been designed.

Furthermore, independent drive motors are known the drive shafts of which extend out of the housing. These shafts must be coupled mechanically to the shafts of the centrifugal pumps. With these units, a substantial apparatus expense is required, and in addition thereto, sealing problems arise. Furthermore, these drive units are not entirely safe, because the pump water upon improper manipulation is able to come into contact with the electrical parts of the motor.

SUMMARY OF THE INVENTION

An object of this invention is to provide an independent electrical drive motor for the field of aquaria, which is able to be used for various units, which is able to be connected thereto without any problems, and which in addition thereto is safe.

According to the invention, the side of the motor housing directed toward the water pump is formed as a thin-walled diaphragm with a planar outer surface which is engagable with a likewise planar sealed diaphragm surface of the pump casing, and that in the vicinity of the diaphragm there are provided securing means for a connection of the motor housing to the pump casing.

Such a universally hermetically sealed motor may be used without any problems in the field of aquaria and may even be submerged in water, and it may be coupled without any problems to various drive units, in particular various pump types. By virtue of the universal applications of this drive motor, it is also possible to manufacture it in large quantities and thus more economical.

Preferably, a bayonet connection is provided between the motor housing and the pump casing as securing means. It may be assembled with a single manipulation step without any tools in a short period of time. Conveniently, at the motor housing the bayonet male part is formed integrally therewith around the thin-walled diaphragm, while the bayonet female part is provided at the pump casing integrally therewith, the bayonet female part being formed as an annular, axially projecting flange encompassing the diaphragm surface and having radially inwardly directed securing lobes. Also, a separate encompassing ring may be provided as bayonet female part, which has a circumferential engagement rim for retaining the pump casing.

The motor housing is preferably formed cup-shaped and sealed at the side opposite to the diaphragm by a closure having a circumferential sealing ring.

The motor housing is peferably a plastic injection-molded part. The electrical lead should be a cable enclosed by an insulating shell molded sealingly into the closure wall and passing through it.

The electrical motor including a laminate pack, coil and rotor may be disposed at two outer pins arranged parallel to the rotor axis, the pins being inserted at the side of the diaphragm in cylindrical recesses in the motor housing and provided at the opposite side with elastic end caps which rest on the inner surface of the applied housing closure. The pins may consist of two interscrewable sections, the one section having a central screw spigot and the other section having a central tapped bore. The screw spigot extends through the laminate pack and two offset brackets arranged at both ends of the laminate pack, the brackets supporting the rotating motor components, while the interscrewed pin sections firmly compress and retain the laminate pack and the brackets with their faces opposing one another.

The motor housing is preferably filled with a permanent oil filling so that a permanent lubrication is insured. For circulating the oil in the housing, at least at one face of the interior of the housing a circularly extending, axially projecting flange may be arranged having recesses, between the flange and the inner wall of the motor housing radial webs being provided with inclined cam surfaces.

In order to obtain a satisfactory cooling of the motor with simple means, the motor housing may be provided around its circumference with integrally formed, radially directed cooling ribs extending in axial direction.

At the same time, these may be used for retaining or securing the motor. For securing or retaining, a bracket may be provided having a two-armed clamp, the arms of which engage between the cooling ribs of the motor housing.

BRIEF DESCRIPTION OF THE DRAWINGS

The invention is illustrated in the drawings by way of example and described hereinafter in detail in referring to the drawings. Therein.

DESCRIPTION OF THE PREFERRED EMBODIMENTS

Figure 1:
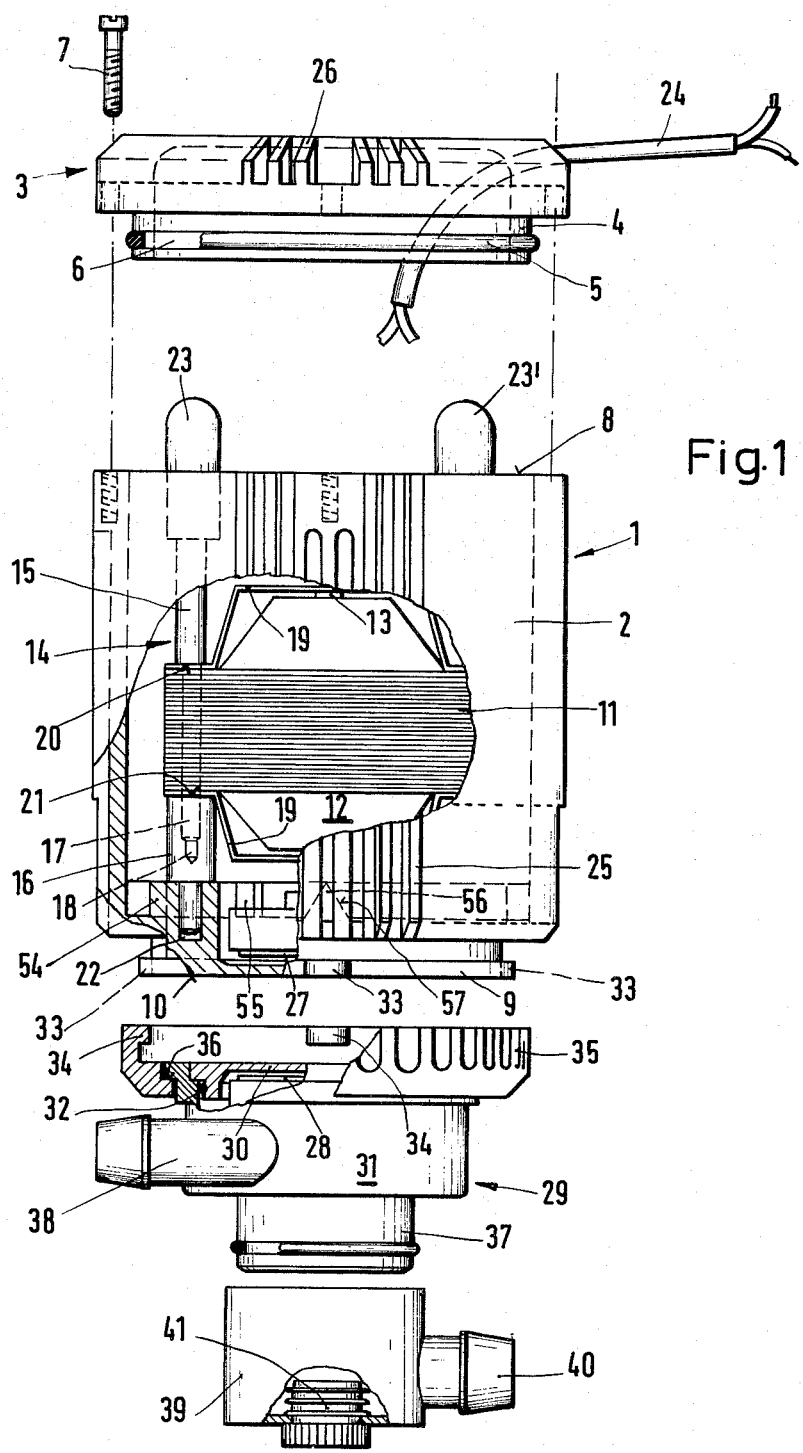
FIG. 1 is an exploded illustration of a motor with an attached centrifugal pump.

According to the drawings, the electrical drive motor 1 has a cup-shaped housing 2 which is a plastic injection-molded part. The cup-shaped housing 2 is closable by a closure 3 likewise formed as a plastic injection-molded part. The closure 3 which has the same outer diameter as the housing 2 positively mechanically engages with a cylindrical guide portion 4 into the cylindrical interior of the housing 2. An O-ring 5 serves as a liquid- and gas-proof seal, the O-ring being inserted into a circumferential groove 6 formed into the cylindrical guide portion 4. The closure 3 may be secured by means of bolts 7 to the open face 8 of the housing 2.

At the side opposite to the open face 8 closable by the closure 3, the housing 2 is sealed by an integrally formed thin-walled diaphragm 9 which has a planar outer surface 10.

In the interior of the housing, the individual motor components such as the laminate pack 11, the coil 12 as well as the rotor with its shaft 13 are retained by means of two pins 14 which are disposed parallel to one another on opposite sides of the motor shaft outside of the rotating motor components. The pins consist of two interscrewable sections 15 and 16, the one section 15 having a central screw spigot 17 and the other section 16 having a central screw tapped bore 18. The two screw spigots 17 extend through the laminate pack 11 as well as two offset brackets 19 arranged at both ends of the laminate pack, the two faces 20 and 21 of the pin sections 15 and 16 opposing one another compressing and retaining the laminate pack 11 as well as the brackets 19 firmly. The pins 14 are located at the side of the motor housing provided with the diaphragm 9 in cylindrical recesses 22 and carry resilient end caps 23 at the opposite side which rest at the inner surface of the applied housing closure 3.

The rotating motor parts are retained in the brackets 19 offset which are carried by the pins 14, along with the laminate pack 11.

A cable 24 enclosed by an insulating shell serves as conductor lead, the cable passing through the closure wall and being sealingly molded thereinto. When the closure is firmly applied, the motor housing 2 is consequently firmly sealed without in the area of the electrical leads a leakage being able to occur. The motor housing may thus be used without any problems submerged in water.

For cooling the motor, the motor housing 2 is provided around its circumference with integrally formed, radially projecting cooling ribs 25 extending in axial direction. Similarly, the closure 3 has according cooling ribs 26 at its face.

Directly behind the diaphragm a formed integrally with the motor housing 2, there is located the inboard part 27 of a permanent-magnetic coupling. The permanent magnetic coupling part 27 serves to compulsorily move along a complementary permanent magnetic coupling part 28 of a centrifugal pump 29 because of the magnetic attraction of one coupling part for the other. The coupling part 28 associated to the pump is disposed directly behind the likewise planar diaphragm 30 which at the side facing the motor 1 defines a sealing closure of the pump casing 31. The diaphragm 30 has the shape of a lid which is applied sealingly to the pump casing 31 through the intermediary of a seal ring 32.

In operation, the diaphragm 30 of the pump casing 31 flatly engages the diaphragm 9 of the motor housing 2 so that the magnetic coupling forces are transmitted through the two diaphragms 9 and 30 and thus the motor 1 is able to drive the pump 29.

For connecting the motor housing 2 to the pump casing 31, a bayonet connection is provided. The male part of the bayonet connection with its outwardly directed lobes 33 is integrally arranged with the motor housing 2 around the diaphragm 9. The female part of the bayonet connection with the inwardly directed retaining lobs 34 is located at a separate encompassing ring 35 which is placed about the pump casing 31 and retains it with a circumferential abutment rim 36 and urges it against the diaphragm 9 of the motor housing 2.

The water to be circulated is drawn through the suction socket 37 into the pump casing 31 upon operation of the motor and is forced out through a socket 38 applied tangentially to the pump casing.

So that the motor 1 may be used both in a vertical and in a horizontal position with the pump attached, a connecting member 39 applicable to the suction socket 37 of the pump 29 is provided into which member the water to be circulated is able to enter either in a radial or in an axial direction.

For a radial entry of the water drawn, a lateral socket 40 selectively closable is provided. For an axial entry of the water, an axial passage bore is provided which in the embodiment illustrated in the drawings is closed by a plug 41. When the water is to enter the connecting member 39 in axial direction, instead of the plug 41 a connecting member is inserted, and the connection 40 is closed.

The motor 1 may be filled with an oil filling in view of the fact that its housing 2 is universally hermetically sealed. The oil quantity is conveniently selected such that in the inoperative condition of the motor all bearing parts are covered by oil. In order to achieve a satisfactory circulation during operation of the motor, at the face of the interior of the motor housing associated to the coupling, a circumferentially extending, axially projecting flange 54 is provided which has spaced recesses 55. Between the flange 54 and the inner wall of the motor housing, there are provided radial webs 56 which have a roof-shaped cross-section with inclined cam surfaces 57. In operation of the motor in a vertical position and also in a horizontal position not illustrated in the drawings, the oil is propelled outwardly by the rotating coupling part 27, passes through the recesses 55 provided in the flange 54 and is distributed throughout the entire interior of the motor housing 2 upon striking upon the inclined cam surfaces 57.

Figure 2:
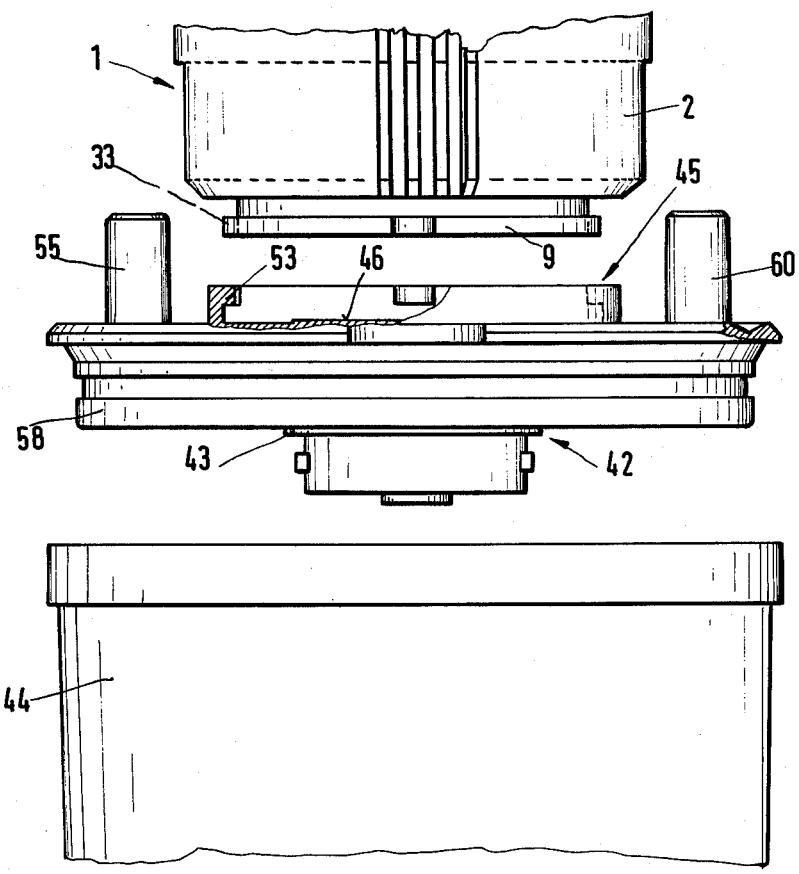
FIG. 2 is the end portion of the motor of FIG. 1 bearing the diaphragm in conjunction with a different embodiment of a pump.
Figure 3:
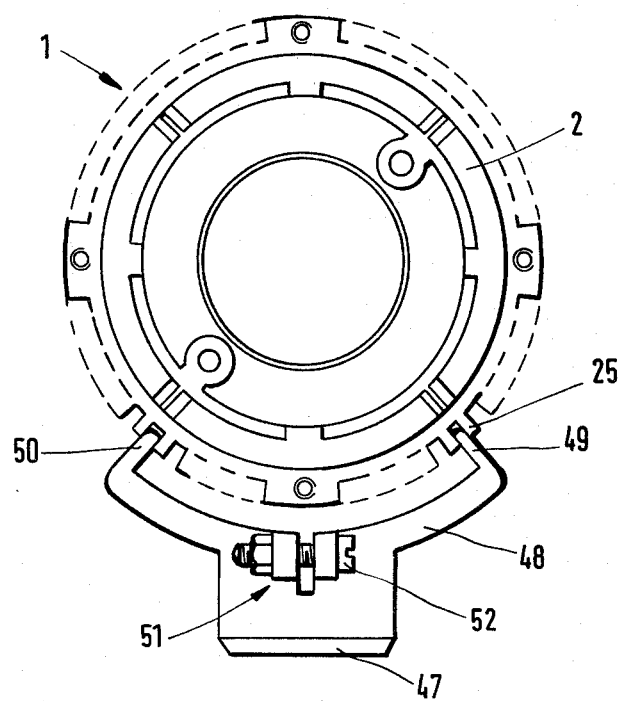
FIG. 3 is a front elevational view of the motor of FIG. 1 on a retaining bracket.

In the embodiment illustrated in FIG. 2, the motor 2 cooperates with a centrifugal pump 42 the casing 43 of which is secured to a lid 58 for an upright filter vessel 44. The lid has a water inlet directly leading into the vessel 44 and a water outlet 60 connected to the pump casing 42. In operation, a filter not illustrated in the drawing is connected to the pump casing.

In this embodiment, the part 45 at the pump side, of the bayonet connection provided between the motor housing 2 and the pump casing 42 is directly integrally formed to the closure 58. When the motor housing 2 is engaged with its diaphragm 9 with the diaphragm surface 46 of the pump casing 43, the parts of the bayonet connection interengage, and after a short rotation, the projecting lobes 33 of the part of the bayonet connection associated to the motor are retained by the inwardly directed retaining lobes 53 of the part of the bayonet connection associated to the pump.

In order to be able to retain the motor 1, independent of other units, a bracket 47 is provided having a two-armed clamp 48 the arms 49 and 50 of which engage between the cooling ribs 25 of the motor housing 2. By operating a clamp mechanism 51, the arms 49 and 50 are slightly moved toward one another, so that they are firmly located between the cooling ribs 25. A screw 52 serves as clamping mechanism.

What is claimed is:

1. A sealed electrical drive motor, in particular for water pumps in the field of aquaria, the motor comprising a motor shaft, a universally liquid-proof and gas-proof sealed housing including a thin walled diaphragm at one end thereof, a permanent-magnetic coupling including a magnetic member on said motor shaft which acts through said thin-walled diaphragm, an end of said motor housing which is to face a water pump being defined by said thin-walled diaphragm, said thin-walled diaphragm having a planar outer surface which is engageable with a likewise planar, sealed diaphragm surface of a pump casing, and where in vicinity of said thin-walled diaphragm there are provided securing means for connecting said motor housing to a pump casing.

2. A drive motor as set forth in claim 1, including a pump casing, and wherein said securing means comprises bayonet connection between said motor housing and said pump casing.

3. A drive motor as set forth in claim 2, wherein said bayonet connection comprises a bayonet male part integrally formed with said motor housing, said thin-walled diaphragm, extending radially outward from said male part.

4. A drive motor as set forth in claim 3, wherein said female part is a separate encompassing ring having a circumferential abutment ring for retaining said pump casing.

5. A drive motor as set forth in claim 1, wherein said motor housing is cup-shaped and including a closure having a circumferential sealing ring, said motor being closable at a side opposite to said thin-walled diaphragm by said closure having said circumferential sealing ring.

6. A drive motor as set forth in claim 1, wherein said motor housing is a plastic injection-molded part.

7. A drive motor as set forth in claim 5, including electrical leads in a cable encompassed by an insulating shell which passes through a wall of said closure and is sealingly molded thereinto.

8. A drive motor as set forth in claim 1 wherein the electric motor includes a laminate pack, coil and rotor having an axis, two outer pins disposed parallel to said rotor axis, said pins being inserted at a side of said thin-walled diaphragm in cylindrical recesses in said motor housing, and resilient end caps resting at an inner surface of said closure.

9. A drive motor as set forth in claim 8, wherein said pins consist of two interscrewable sections, one of said sections having a central screw spigot and the other of said sections having a central tapped bore, wherein said screw extends through said laminate pack and two offset brackets arranged at both ends of said laminate pack, said brackets supporting rotating motor components, and wherein said sections compress and retain firmly said laminate pack and said brackets with their faces opposing one another.

10. A drive motor as set forth in claim 1, wherein said motor housing has a permanent oil filling.

11. A drive motor as set forth in claim 10, wherein at least at one face of an inner edge of said motor housing there is arranged a circumferentially extending, axially projecting flange having recesses and wherein between said flange and an inner wall of said motor housing radial webs having inclinded cam surfaces are provided.

12. A drive motor as set forth in claim 1, wherein said motor housing is provided around its circumference with integrally formed, radially directed cooling ribs extending in axial direction.

13. A drive motor as set forth in claim 12, including a bracket provided as motor retaining means having a two-armed clamp the arms of which engage between said cooling ribs of said motor housing.

* * * * *